United States Patent [19]
Shah

[11] Patent Number: 5,746,048
[45] Date of Patent: May 5, 1998

[54] COMBUSTOR FOR A GAS TURBINE ENGINE

[75] Inventor: Nipulkumar Shah, San Diego, Calif.

[73] Assignee: Sundstrand Corporation, Rockford, Ill.

[21] Appl. No.: 307,967

[22] Filed: Sep. 16, 1994

[51] Int. Cl.[6] .................................................. F02G 3/00
[52] U.S. Cl. ........................ 60/39.06; 60/39.36; 60/756; 60/757
[58] Field of Search ..................... 60/39.06, 39.36, 60/749, 752, 756, 757

[56] References Cited

U.S. PATENT DOCUMENTS

| | | | |
|---|---|---|---|
| 2,867,267 | 1/1959 | Nerad et al. | 158/1 |
| 3,118,489 | 1/1964 | Anthes | 158/7 |
| 3,333,414 | 8/1967 | Saintsbury | 60/39.65 |
| 3,671,171 | 6/1972 | Doyle | 431/116 |
| 3,869,864 | 3/1975 | Bunn | 60/39.65 |
| 4,151,709 | 5/1979 | Melconian et al. | 60/39.36 |
| 4,244,179 | 1/1981 | Kainov et al. | 60/39.36 |
| 4,301,657 | 11/1981 | Penny | 60/748 |
| 4,891,936 | 1/1990 | Shekleton et al. | 60/39.36 |
| 4,928,479 | 5/1990 | Shekleton et al. | 60/39.36 |
| 4,949,545 | 8/1990 | Shekleton | 60/39.36 |
| 5,069,033 | 12/1991 | Shekleton | 60/39.36 |
| 5,113,647 | 5/1992 | Shekleton | 60/39.36 |
| 5,163,284 | 11/1992 | Shekleton | 60/39.36 |
| 5,241,818 | 9/1993 | Shekleton et al. | 60/39.36 |
| 5,261,224 | 11/1993 | Shekleton et al. | 60/39.36 |
| 5,263,316 | 11/1993 | Shekleton | 60/39.36 |
| 5,265,425 | 11/1993 | Howeel | 60/756 |
| 5,277,022 | 1/1994 | Shekleton et al. | 60/39.36 |
| 5,303,543 | 4/1994 | Shah et al. | 60/39.36 |
| 5,317,864 | 6/1994 | Shorb et al. | 60/39.36 |
| 5,331,803 | 7/1994 | Shekleton | 60/39.36 |

FOREIGN PATENT DOCUMENTS

| | | |
|---|---|---|
| 2203023 | 5/1974 | France . |
| 2020371 | 11/1979 | United Kingdom . |
| WO9108421 | 6/1991 | WIPO . |

OTHER PUBLICATIONS

PCT Search Report mailed Jan. 2, 1996 to Intellectual Property Law Department of Sundstrand Corporation.

*Primary Examiner*—Charles G. Freay
*Attorney, Agent, or Firm*—Lawrence E. Crowe

[57] ABSTRACT

A compact gas turbine engine having improved fuel efficiency, lower emissions, better starting capability, and longer operational life is provided at low cost through the use of a combustor incorporating tangential fuel injection in conjunction with certain strategically placed and sized oxidant inlet jets. The oxidant inlet jets include deflector jets which deflect a generally circumferentially spiralling flow of gases within the combustor in a manner causing fuel and oxidant to recirculate for a longer period of time within a primary combustion zone, to thereby improve combustion efficiency and reduce undesirable emissions. Apparatus and methods for regulating injection of the fuel and oxidant in or primary, secondary, and dilution zones of the combustor in a manner providing improvements in fuel efficiency, high altitude starting and other advantages are also defined.

57 Claims, 10 Drawing Sheets

COMBUSTOR FOR A GAS TURBINE ENGINE

FIELD OF THE INVENTION

My invention relates to a combustor which is particularly suited for use in compact, low cost gas turbine engines of the type typically used in aircraft auxiliary power systems, hybrid vehicle propulsion systems, or portable electric power plants.

BACKGROUND INFORMATION

Combustors are conceptually straightfoward devices. They basically provide a chamber in which a fuel and an oxidant, such as air, are combined and burned to create hot gases of combustion. In practice, however, designing an efficient combustor is not a simple task.

In order to extract the maximum available energy from the fuel, and to reduce emissions to a minimum level, a combustor must provide an environment in which complete combustion of the fuel can occur. Provisions must be made to thoroughly mix the fuel and oxidant. Where the fuel to be burned in the combustor is a liquid, such as diesel fuel, rather than a gas, such as propane or natural gas, the combustor must also provide some means for atomizing and evaporating the liquid before combustion can occur.

The combustor must also include some means for igniting the fuel and oxidant mixture, as well as means for maintaining a stable flame following ignition. Igniting the fuel and maintaining a stable flame can be particularly difficult in combustors which must operate during exposure to severe environmental conditions. For example, the combustor of an aircraft mounted emergency or auxiliary power unit must be capable of routinely starting and operating during prolonged exposure to the cold ambient temperatures and rarefied air pressures which are incident with high altitude operation of the aircraft. Under these conditions, it is more difficult to achieve atomization of liquid fuels. Achieving proper mixing of the fuel and oxidant to ensure that reliable ignition and a stable flame are provided, despite the rarefied air pressures and low ambient temperatures, requires that special care be taken during the design of the combustor.

Regardless of environmental factors, efficient combustion can generally be attained only at very high combustion temperatures. Most known materials are not capable of withstanding such high temperatures for significant lengths of time, however, thereby creating the need to provide a way of cooling those parts of the combustor which are exposed to the hot gases of combustion, in order to achieve an acceptable operating life. This cooling is often provided by introducing a filmlike flow of oxidant along the interior surfaces of the combustor.

In addition to protecting the combustor from damage incident with the use of high combustion temperatures, provisions must also be made for cooling the hot gases of combustion to a lower temperature, following the actual high temperature combustion process, in order to achieve acceptable life in downstream components such as turbines, nozzles, or exhaust ducting, which are exposed to the hot gases of combustion produced in the combustor. This cooling of the hot gases of combustion is often accomplished by providing means within the combustor for mixing additional oxidant with the hot gases, following combustion, in order to dilute the hot gases and thereby reduce the temperature of the resultant mixture to a level which will yield acceptable operating lifetimes in the downstream components.

Each of the processes described above requires that the fuel and oxidant be brought together in precisely controlled amounts at specific points in time during the combustion process. Furthermore, it will be appreciated that each of the various steps in the combustion process requires a finite length of time for successful completion. Accomplishing such control, and providing a design which allows the fuel and oxidant sufficient dwell time within the combustor to achieve reliable ignition, a stable flame, efficient combustion, and low emissions, can be particularly challenging in compact combustors of the type utilized in small gas turbine engines. This is especially true for small gas turbine engines suitable for use as hybrid vehicle powerplants, or aircraft auxiliary power units, which must also be designed to allow mass production at low cost.

In attempting to overcome these difficulties, such compact engines have utilized an annular shaped combustion chamber disposed about the axis of rotation of the turbine. By utilizing such an annular configuration, the combustor may be "tucked in" and wrapped closely around the periphery of the turbine. Such annular combustors are thus highly restricted in both axial length and radial width. In order to provide a flow path through the combustor which is long enough to allow appropriate dwell time for combustion and mixing, these combustors sometimes employ so-called "side-winding" within the combustion chamber. Unlike conventional combustors, wherein the fuel and oxidant, as well as the hot gases of combustion, are introduced into and travel through the combustion chamber in a primarily axial direction, the path of travel within a combustor employing side-winding is primarily in the circumferential direction around the interior of the annular combustor. The axial flow component of the fuel, the oxidant and the hot gases of combustion is minimized. This arrangement attempts to maximize the time available for combustion by causing the fuel and oxidant utilized for combustion to follow a long, spiralling flow path in travelling from the point of injection to the outlet of the combustor. This arrangement can also permit a significant reduction in the number of fuel injectors required, thereby reducing complexity, weight and cost of the combustor, without incurring an undesirable maldistribution of temperatures in the hot gases of combustion exiting the combustor.

In addition, some prior compact combustors, employing either axial or side-winding flow, have included means for segregating specific areas within the combustion chamber into a primary combustion zone, one or more secondary combustion zones, and a dilution zone. Fuel and oxidant are then sequentially introduced into these zones in appropriate proportions to facilitate combustion and efficient mixing, or to create fuel rich regions to facilitate starting the engine. These means for segregating specific areas within the combustion chamber have been provided in some instances by physical baffles, or alternatively by oxidant injection devices which create dynamic gas barriers for disrupting the flow of gases through the combustor at appropriate points.

Although the techniques described above for creating a long, side-winding flow path and specific zones within a compact combustor allow significant improvements in combustor performance to be achieved in comparison to combustors employing non-segregated axial flow, additional improvement is highly desirable. Accordingly, a primary object of my invention is to provide an improved compact gas turbine engine, including a combustor which allows engine efficiency to be increased, with a corresponding reduction in undesirable emissions. Another object of my invention is to provide a combustor which will reliably start and maintain a stable flame under severe operating environments, including those environments encountered by airborne gas turbine engines during operation at high altitudes. It is also an object of my invention to provide a compact combustor suitable for use in accordance with the above stated objects which can be mass produced at low cost.

In the past, combustor design has been as much an art as a science, often involving a considerable amount of "cut and try" experimentation in order to achieve an optimal design. It is, therefore, a further object of my invention to define certain generic relationships for use as guidelines in designing efficient compact combustors suitable for use in gas turbine engines.

SUMMARY OF THE INVENTION

My invention achieves these objects by providing an improved side-winding combustor, which may include distinctly defined primary, secondary, and dilution zones, as described above. A combustor constructed according to my invention includes means for deflecting the side-winding flow in a manner causing the fuel and oxidant to recirculate for a longer period of time within the primary combustion zone, to thereby improve the fuel efficiency and reduce undesirable emissions. Means for regulating injection of the fuel and oxidant into primary, secondary, and dilution zones of a combustor, according to certain specific relationships which I have defined, may also be included in order to further improve the fuel efficiency and reduce undesirable emissions.

Specifically, the combustor of my invention includes a liner having a generally annular shaped outer wall disposed about an axis and closed at one axial end thereof by a radially extending end wall. The liner thus defines a cylindrical or annular shaped combustion chamber having one axial end closed by the end wall, and an opposite axial end wall open to define an outlet of the combustor. Fuel and oxidant injector means are provided for injecting a stream of atomized fuel into the combustion chamber in a generally tangential direction along a first transverse plane, located adjacent the end wall, and axially spaced from the end wall in a direction toward the outlet of the combustion chamber. By spacing the first transverse plane axially from the end wall, a recirculation zone is provided between the first transverse plane and the end wall. By orienting the fuel and oxidant injector means to inject a stream of atomized fuel into the combustion chamber in a tangential direction, a generally circumferentially spiralling, side-winding, flow pattern is created, emanating from the fuel and oxidant injector means and extending axially to the outlet of the combustion chamber. The circumferentially spiralling flow pattern thus created has both a tangential and an axial component of motion, with the axial component being directed toward the outlet.

According to one aspect of my invention, one or more deflector jet means extend through the liner for injecting a deflecting stream of oxidant across the generally tangentially directed stream of atomized fuel in such a manner that the axial component of motion of the circumferentially spiralling flow pattern is reduced, and the flow pattern is deflected toward the end wall of the liner. In a preferred embodiment of the invention, the axial component of flow is reduced to such a degree that the circumferentially spiralling flow recirculates within the recirculation zone prior to moving axially toward the outlet. This recirculation increases the dwell time of the fuel and oxidant within the combustion zone, and promotes more thorough mixing during the actual combustion process. The probability of obtaining complete combustion is thus improved. When complete combustion is achieved, undesirable emissions are minimized, and fuel efficiency of the combustor is improved. In addition to providing improved combustion, the deflector jet means and recirculation zone of my invention also provide improvements in flame stability, fuel atomization, and ignition reliability.

According to another aspect of my invention, additional oxidant inlets are provided at locations downstream from the deflector jets to create dynamic oxidant baffles which divide the combustion chamber into a primary combustion zone, located adjacent the end wall, a dilution zone adjacent the outlet, and a secondary combustion zone located between the primary combustion and dilution zones. The fuel and oxidant injecting means, the deflector jets, and the recirculation zone are all located within the primary combustion zone. Additional features for injecting a film of oxidant along the linerwalls may be included in all three zones. In a preferred embodiment utilizing this aspect of the invention, the combustor is designed such that the sum of the oxidant entering the primary combustion chamber via: 1) the oxidant injector means; 2) the deflector jets; and 3) any film cooling inlets within the primary combustion zone, is maintained in a substantially stoichiometric relationship to the amount of fuel injected. In one highly preferred embodiment utilizing this aspect of my invention, about 25% of the total oxidant is introduced into the primary combustion zone of the combustor, about 30% of the total oxidant is introduced into the secondary zone, and the remaining oxidant utilized is introduced into the dilution zone. By sequentially introducing oxidant according to this formula, the axial component of the flow pattern in the primary and secondary combustion zones is minimized, thereby enhancing the effect of the deflector jets. Flame stability is also enhanced.

In another highly preferred embodiment of my invention, the liner is immersed in a pressurized flow of oxidant having a component of motion in an axial direction toward the end wall, and the deflector jet means are provided by one or more simple, straight-sided, holes extending through the walls of the liner. The holes are strategically placed such that the component of motion in the axial direction of the pressurized flow of oxidant entering the holes is substantially maintained inside the liner to cause the deflecting stream of oxidant to intersect the tangentially directed stream of atomized fuel. By utilizing the component of motion in the axial direction of the pressurized oxidant flowing outside the combustion chamber in the manner described to axially deflect the stream of atomized fuel, my invention eliminates the need for vanes or other oxidant directing means which would significantly increase the complexity and cost of the combustor.

Other aspects, advantages, and novel features of my invention will be readily apparent upon consideration of the following drawings and detailed description of the preferred embodiments.

DESCRIPTION OF THE PREFERRED EMBODIMENT

FIGS. 1–6 depict an exemplary embodiment of my invention in the form of a compact gas turbine engine 10 of a type which might be utilized in a hybrid vehicle powerplant, the auxiliary power unit of an aircraft, or as a prime mover for a portable power plant. Such vehicles or power plants are schematically indicated by Box 11 in FIG. 1. I wish to emphasize, however, that my invention is not limited to merely the exemplary embodiments described herein.

By way of background, gas turbine engines basically include three major components which are known as: (1) a source of pressurized oxidant; (2) a combustor; and (3) a turbine. These three major components are arranged in a series flow relationship. The source of pressurized oxidant, which may be a compressor or a pressurized gas bottle for example, supplies a flow of a pressurized oxidant, such as air, to the combustor. Within the combustor the pressurized oxidant is combined with fuel and burned to produce hot gases of combustion which exit the combustor as a high energy hot gas stream. The turbine then extracts at least a portion of the energy from the hot gas stream to drive the compressor, (if the engine includes a compressor) and any accessories which are operably connected to be driven by the turbine. In some engines, the turbine converts the majority of the energy in the hot gas stream to shaft power. In thrust engines, however, the turbine will extract only a portion of the energy available in the gas stream, with the remaining energy being converted into thrust by discharging the hot gas stream through a thrust nozzle.

Figure 1:
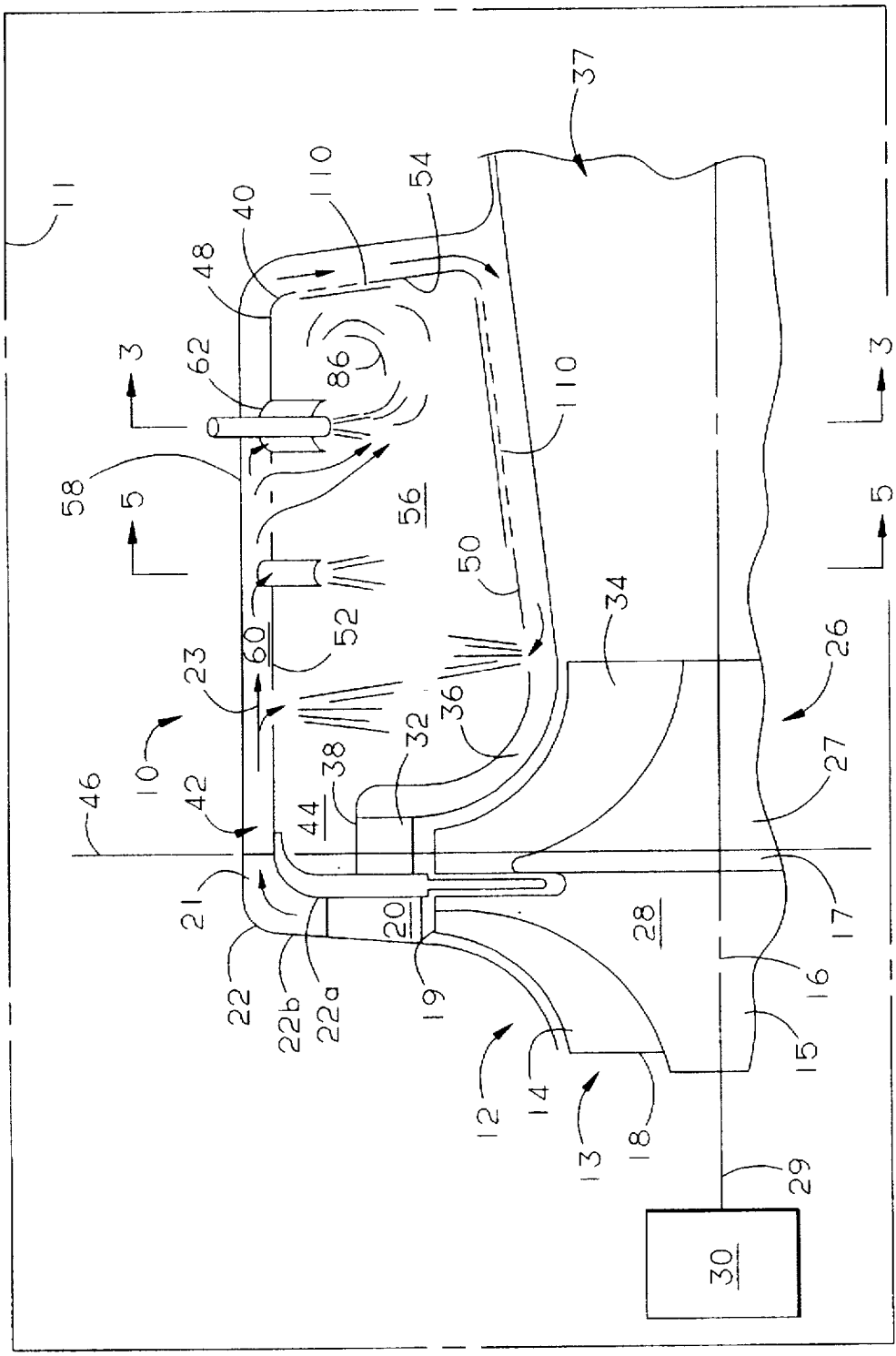
FIG. 1 is a schematic cross-sectional view of a vehicle or power plant including an exemplary embodiment of a gas turbine engine according to the invention.

In the gas turbine engine 10 of the exemplary embodiment, as shown in FIG. 1, the source of pressurized oxidant is a compressor 12. The compressor 12 includes a compressor wheel 13 having a plurality of blades 14 attached to a hub 15 which is mounted, by means not shown, for rotation about an axis 16. As the compressor wheel 13 is rotated about the axis 16, air is drawn into the compressor 12 at a leading edge 18 of the blades 14, compressed by being centrifuged outward, and discharged at a trailing edge 19 of the blades 14 into an annular diffuser 20 which surrounds the compressor wheel 13. The diffuser 20 is part of a housing 22 which generally surrounds the compressor wheel 13. The housing 22 includes walls 22a, 22b, extending in a downstream direction from the diffuser 20 and defining an annular passage which directs the compressed air to an axially facing annular shaped compressor outlet 21.

The compressor 10 thus provides an annular flow of compressed oxidant, i.e. compressed air, at the compressor outlet 21. This annular flow of oxidant includes both an axially directed component of flow, as depicted by arrows 23 in FIG. 1, and a tangentially directed component of flow, as depicted by arrows 24 in FIG. 2. The tangentially directed component of motion 24 is created during the compression process by the rotating compressor blades 14, which impart a circumferentially swirling motion to the oxidant in a direction generally matching the direction of rotation 25 of the compressor wheel 13. In prior gas turbine engines it was sometimes necessary to provide anti-swirl vanes downstream from the compressor for the purpose of removing this swirling motion in order to reduce parasitic pressure losses in the oxidant circuit of the gas turbine engine. As will be described in more detail below, my invention not only eliminates the need for providing such anti-swirl vanes, but I actually utilize the inherent swirling motion of the oxidant in providing a compact combustor of simplified construction which enhances performance of the gas turbine engine.

Returning to FIG. 1, the gas turbine engine 10 of the exemplary embodiment also includes a turbine 26 having a turbine wheel 27 which is operably coupled, by means not shown, to drive the compressor wheel 13. In the engine of the exemplary embodiment the turbine wheel 27 and the compressor wheel 13 are directly joined and configured to form a rotor 28 which rotates about the axis 16. The rotor 28 is coupled to drive a mechanical load 30 by a coupling means, such as a shaft or geartrain for instance, as illustrated schematically at 29 in FIG. 1.

The turbine 26 also includes an annular nozzle 32 disposed radially outward from the turbine wheel for directing a flow of hot gases of combustion at turbine blades 34 which are integrally attached to the turbine wheel 27, thereby causing the turbine wheel 27 to rotate in a direction of rotation 25 about the axis 16. A turbine shroud 36 extends from the nozzle 32 and along a radially outer edge of the turbine blades 34 to confine the hot gases of combustion against the turbine blades 34 as they expand through the turbine 26. The shroud 36 also defines an annular shaped turbine outlet 37. As schematically depicted in FIG. 1, an upstream end 38 of the nozzle 32 functions as a turbine inlet for receipt of hot gases of combustion.

The compressor 12 and the turbine 26 are connected by a reverse-flow annular combustor having an annular inlet 42, disposed about an axis of symmetry, coincident with the axis 16, for receiving the annular flow of oxidant from the compressed air outlet 21 of the compressor 10. The combustor 40 includes means, to be described in greater detail below, for combusting the compressed oxidant with atomized fuel to form the hot gases of combustion. The combustor 40 also includes an annular outlet 44 disposed about the axis 16 for delivering a flow of the hot gases of combustion to the nozzle 32. As best seen in FIG. 1, the inlet and outlet 42, 44 of the combustor 40 of the exemplary embodiment are disposed in a substantially coplaner relationship along a common transversely oriented input/output plane 46 located at one axial end of the combustor 40, with the inlet 42 being located radially outward of the outlet 44.

Figure 2:
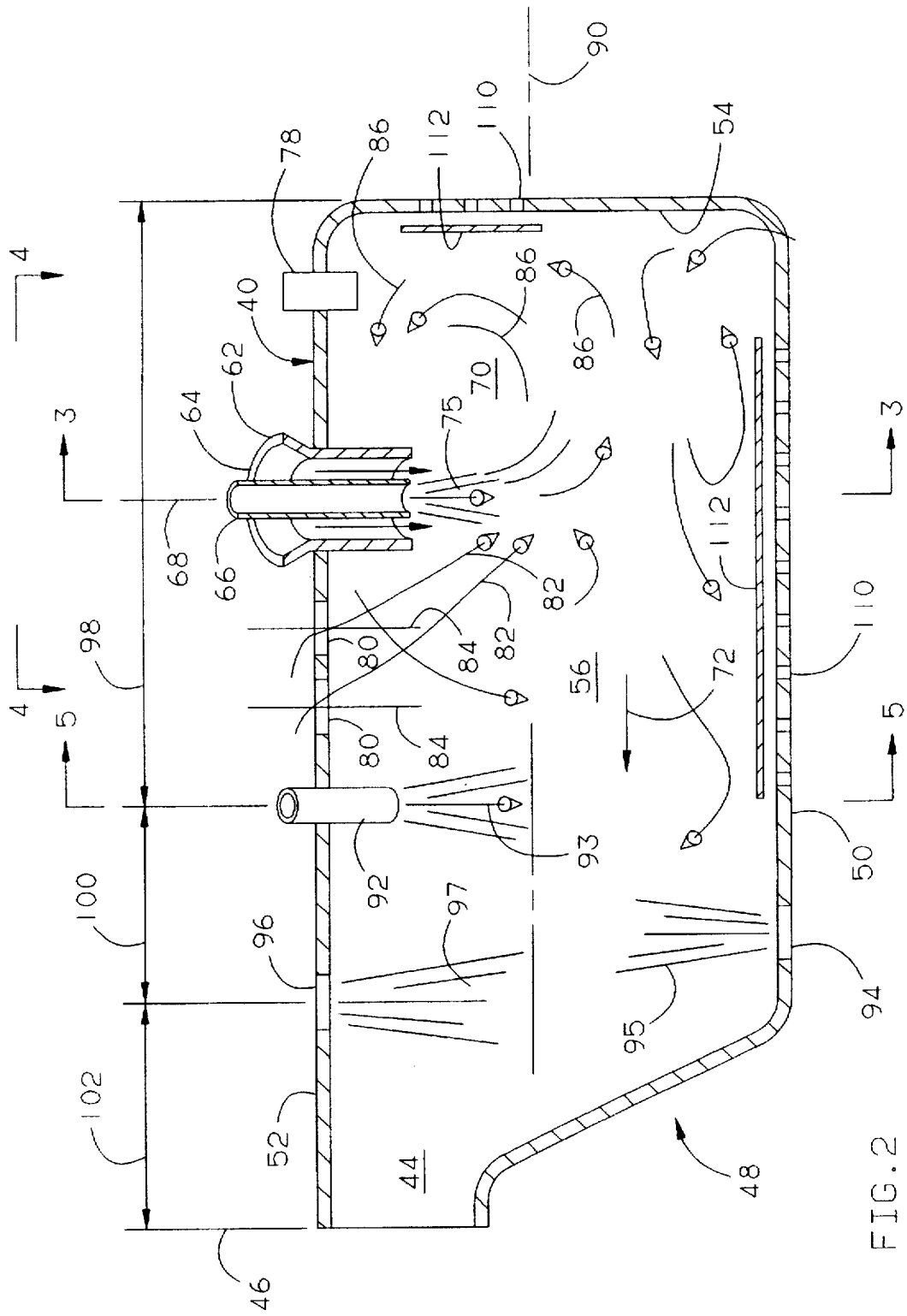
FIG. 2 is an enlarged cross-sectional view of the liner of the combustor of the gas turbine engine of FIG. 1.

As shown in FIGS. 1 and 2, the combustor further includes a liner 48 having generally annular shaped, radially spaced, inner and outer walls 50, 52 extending axially from the combustor outlet 44 and connected at an opposite axial end of the combustor by a radially extending end wall 54. The liner thus defines an annular combustion chamber 56 disposed about the axis 16 and terminating at a downstream end thereof in the annular outlet 44 leading to the nozzle 32. A combustor housing 58 extends from the combustor inlet 42 and substantially surrounds the liner 48 in a spaced relationship to define a plenum chamber 60 between the combustor housing 58 and liner 48 for directing the annular flow of compressed oxidant about the liner 48.

Figure 3:
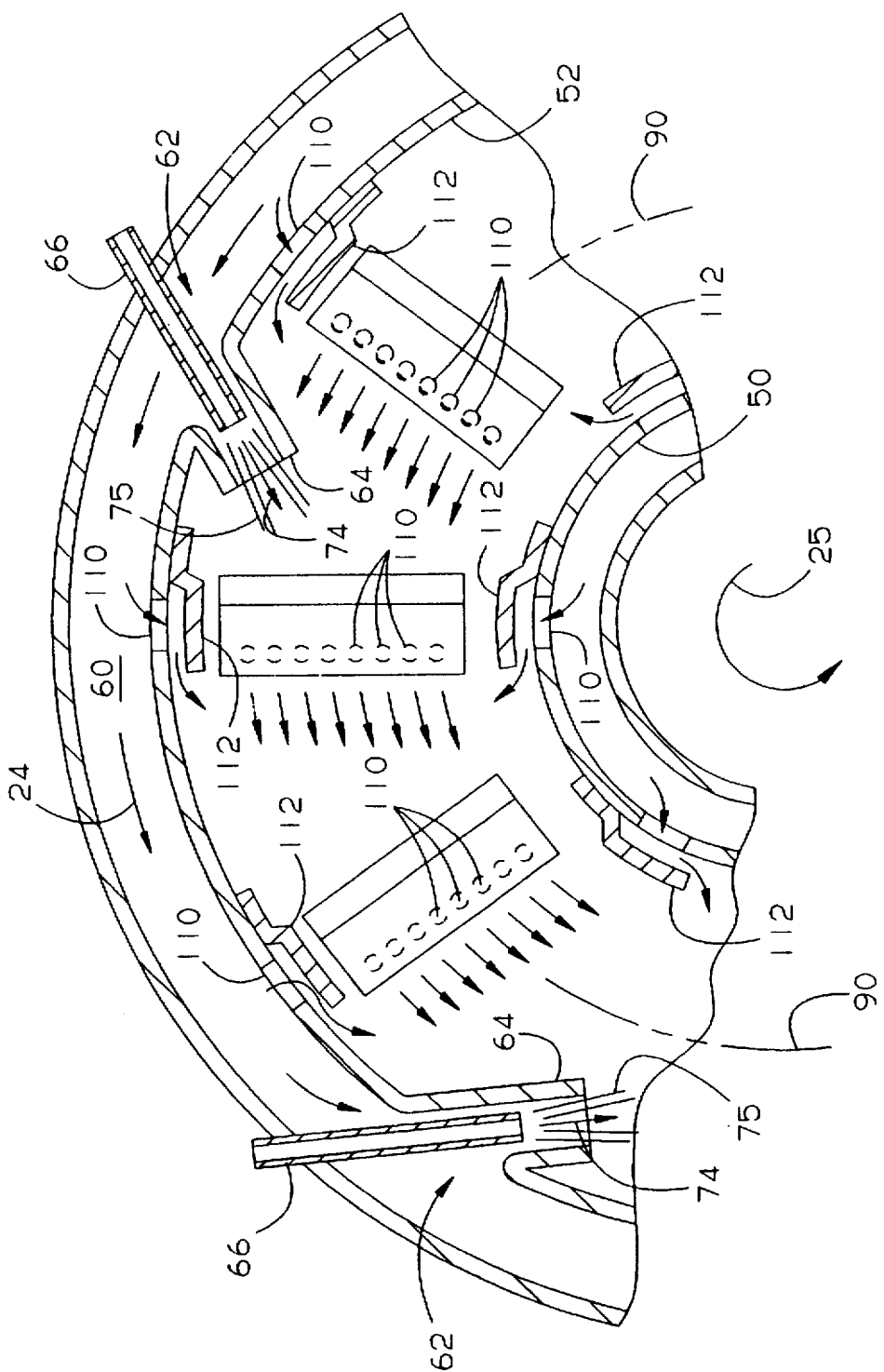
FIG. 3 is a cross-sectional view of a portion of the combustor of FIGS. 1 and 2 taken along Line 3—3.

Fuel and oxidant injector means 62 extend through the outer wall 52 of the liner 48 for injecting streams of oxidant and fuel into the combustion chamber 56 in a generally tangential direction, as indicated schematically by arrows 74 in FIG. 3. As best seen in FIG. 2, the fuel and oxidant injector means 62 are disposed within the combustion chamber 56 along a first transverse plane 68 adjacent the end wall 54 of the liner 48. The first transverse plane 68 is spaced from the end wall 54, however, in a downstream direction toward the outlet 44 to provide a recirculation zone 70, located generally between the first transverse plane 68 and the end wall 54 of the liner 48. The fuel and oxidant injector means 62 thus creates a generally circumferentially spiralling flow of oxidant and atomized fuel, within the combustion chamber 56, emanating from the fuel and oxidant injector means 62 along the first transverse plane 68 and exiting the combustion chamber 56 through the outlet 44. By injecting the fuel and oxidant streams in a generally tangential direction, and locating the fuel and oxidant injector means 62 as described above, the circumferentially spiralling flow of fuel and oxidant within the combustion chamber 56 develops an axial component of motion in a direction toward the outlet 44, as shown by arrow 72 in FIG. 2, in addition to the initial tangential component of motion, as indicated by arrows 74 in FIG. 3.

As best seen in FIG. 2, the fuel and oxidant injector means 62 of the exemplary embodiment is comprised of an air inlet tube 64 which is disposed about and spaced from a fuel tube 66 in a generally concentric fashion. Liquid fuel, supplied by a fuel manifold (not shown), is injected through the fuel tube 66 and sprayed into the combustion chamber 56. High velocity air from the plenum chamber 60 flows through the air inlet tubes 64 to enhance atomization of the liquid fuel, and to provide oxidant for combustion.

As depicted in FIG. 3, the fuel and oxidant injector means 62 injects a stream of atomized fuel 75 in a generally tangential direction along arrow 74. In the exemplary embodiment, the fuel and oxidant injectors 62 are skewed approximately 45 degrees from a true radial orientation in the direction of rotation 25 of the compressor wheel 13. By skewing fuel and oxidant injectors 62 in the direction of rotation 25, in the reverse flow combustor of the exemplary embodiment, I can utilize the inherent swirl component 24 of the compressed oxidant flowing in the plenum chamber 60 to advantage in a manner described more fully below. As a general rule, however, where the liner 48 is immersed in a flow of oxidant having a swirl component 24, the fuel and oxidant should preferably be injected such that the tangential component 74 of the fuel and oxidant stream 75 generally matches the direction of that swirl 24. It should also be understood that the particular tangential orientation scheme selected for the fuel and oxidant injector 62 of the exemplary embodiment, i.e. 45 degrees from radial, is only one of a virtually unlimited number of "generally tangentially directed" injection schemes which can be utilized in practicing my invention. In other embodiments of my invention, for instance, it might be more advantageous to inject the fuel and oxidant stream in a direction tangential to an inner wall of an annular combustor, or alternatively, tangential to a mean radius 90 disposed halfway between the inner and outer walls 50, 52 of the liner 48.

Those skilled in the art will also readily recognize that my invention is not limited to the particular fuel and oxidant injector means 62 illustrated in the exemplary embodiment. Many other types of fuel injectors could be utilized with equal advantage. (See, for example, commonly assigned U.S. Pat. No. 4,891,936). It is also not necessary that the air or other oxidant be injected concentrically to the fuel. Separate air inlets, located generally along the first common plane 68, could also be utilized. (See, for example, commonly assigned U.S. Pat. No. 5,317,864). Virtually any fuel and oxidant injector means capable of creating a circumferentially spiralling flow of gaseous or atomized fuel can be adapted for use in an embodiment of a combustor constructed according to my invention.

Ignitor means 78 are provided for igniting and combusting the circumferentially spiraling flow of oxidant and fuel, to create a spiralling flow of hot gases of combustion having both an axial and a tangential component of motion, as indicated respectively by arrows 72, 74 in FIGS. 2 and 3.

Deflector jet means, in the form of straight-sided holes 80, extend through the outer wall 52 of the liner 48. These holes 80 are carefully sized and strategically placed to inject a portion of the annular flow of oxidant 23, 24 from the plenum chamber 60 into the combustion chamber 56, and across the circumferentially spiralling flow of hot gases of combustion, in such a manner that the circumferentially spiralling stream is deflected toward end wall 54. Specifically, the holes 80 are sized such that the oxidant issuing therethrough forms a series of deflector jets, as indicated by arrows 82, having sufficient velocity to penetrate the circumferentially spiralling flow of hot gases within the combustion chamber 56 and reach a desired point of intersection with the tangentially oriented fuel stream 75. The holes 80 are strategically positioned about radially directed centerlines disposed in a circumferentially spaced relationship along one or more second transverse planes 84 axially spaced in a downstream direction from the first transverse plane 68.

Figure 4:
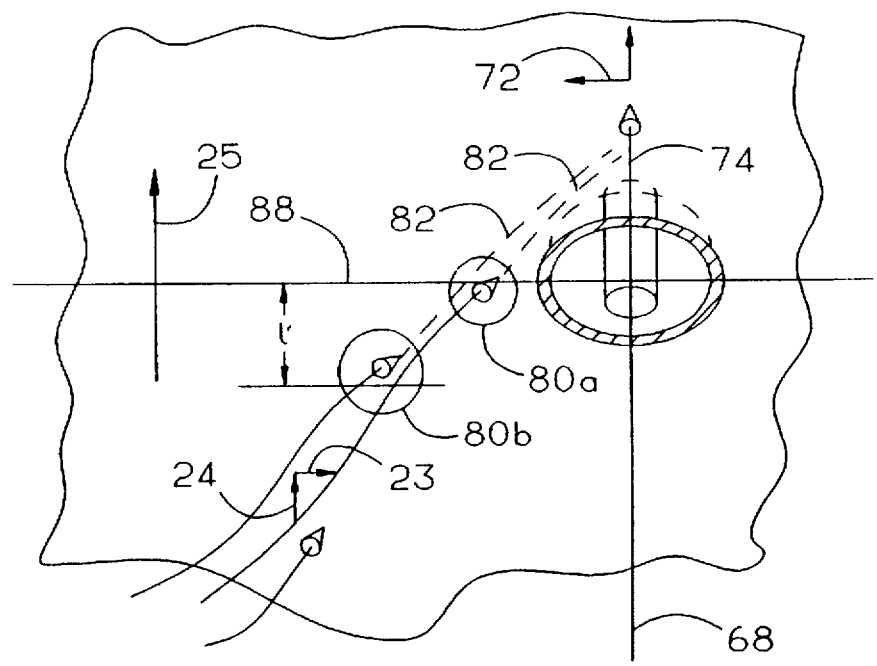
FIG. 4 is a top view of a section of the outer wall of the liner of FIG. 2.

The holes 80 are placed and sized such that the component of motion in the axial direction 23 of the flow of oxidant in the plenum chamber 60 is substantially maintained in the deflector jets 82. Furthermore, as shown in FIG. 4, the tangential component of flow 24 in the plenum chamber 60 is also substantially maintained and utilized to advantage such that the need for oxidant directing inlet tubes or scoops around the holes 80 is eliminated. Those skilled in the art will recognize, however, that in embodiments of the invention which utilize a source of oxidant other than a compressor or other device that inherently produces swirl, such oxidant directing devices may be utilized to advantage in achieving a proper intersection of the deflector jet with the tangentially directed fuel/oxidant stream. In addition, where the walls of the liner are thick, as compared to the thin sheet metal walls of the exemplary embodiment, it may be desirable to angle the sides of the holes to help preserve the components of flow in the plenum chamber.

As illustrated in FIG. 4, the holes 80 or other forms of deflector jet means need not necessarily be located along a diametral plane passing through the intersection of the fuel and oxidant injector means 62 with the liner 48. In the exemplary embodiment a pair of holes 80, individually designated 80a and 80b in FIG. 4, are associated with a fuel and oxidant injector 62. The first hole 80a of the pair is located on a diametral plane 88 passing through the intersection of the injector 62 with the liner 48. The second hole 80b of the pair is offset a distance "l" from the diametral plane 88 in a direction opposite to the direction of rotation 25. The second hole 80b is also axially displaced farther from the injector 62 than the first hole 80a. As a result of the geometric relationship set up by this arrangement of holes 80a, b, with respect to the injector 62 and the direction of rotation 25 of the compressor 10, oxidant entering the first hole 80a will substantially intersect the radially outer edge of the atomized fuel stream 75 and oxidant entering the second hole 80b will tend to intersect the radially inner edge of the atomized fuel stream 75. The oxidant passing through the first and second holes 80a, b thus forms two deflector jets 82 which work in unison to reduce the axial component of motion 72 of the circumferentially spiralling stream, thereby increasing the dwell time of the hot gases of combustion within the combustion chamber 56. Ideally, the axial component is reduced sufficiently to create a recirculating flow pattern within the recirculation zone, as indicated generally by arrows 86 in FIGS. 1 and 2, thereby improving combustion efficiency and reducing emissions of the gas turbine engine 10. The use of paired holes as described above provides the additional advantage of improving atomization in the case of embodiments utilizing liquid fuels.

It is also preferred that the deflector jets 82 have sufficient momentum and be oriented to intersect the tangentially directed atomized fuel stream 75 toward a radially inner, rather than a radially outer, point within the combustion chamber 56. Application of this aspect of my invention in an annular combustor of the type illustrated in the exemplary embodiment, for example, requires that the intersection of the deflector jet 82 and the fuel stream 75 occur below a mean radius 90, illustrated in FIGS. 2 and 3, located halfway between the inner and outer walls 50, 52 of the liner 48. In addition to providing an enhancement of the deflecting action, such an orientation will also result in improved mixing of the burned and unburned fuel and oxidant within the combustion chamber. This improved mixing is the result of breaking up any inherent stratification which might otherwise occur between the hot gases of combustion and the unburned reactants, due to centrifugal effects generated within the circumferentially spiraling flow pattern. Without the deflector jets 82 of my invention, the less dense hot gases of combustion are generally centrifuged inward, and the denser unburned reactants are centrifuged outward by the circumferentially spiralling flow pattern. A stratified layering of burned and unburned reactants thus develops. By designing the combustor of my invention such that the deflector jets 82 intersect the fuel stream 75 below the mean radius 90, portions of the hot gases of combustion are forced to recirculate outward through the unburned reactants. This recirculation of the hot gases helps to more effectively heat the unburned reactants to ignition temperature, and improves mixing, thereby improving combustion efficiency.

Figure 6:
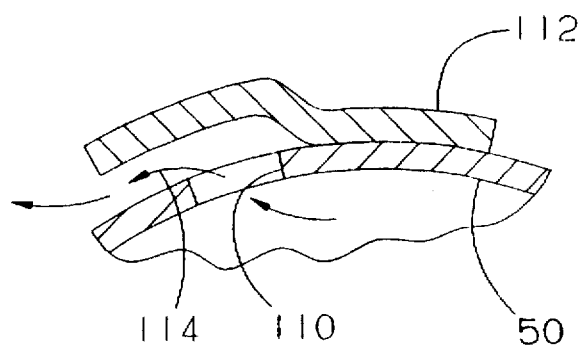
FIG. 6 is an enlarged cross-sectional view of cooling strips and perforations utilized for convective cooling of the liner walls.

As shown in FIGS. 1, 2, and 3, the inner, outer, and end walls 50, 52, 54 of the liner 48 include rows of perforations 110, which allow relatively cool compressed oxidant from the plenum chamber 60 to enter the combustion chamber 56. The perforations 110 in the inner and outer walls are arrayed in axially oriented rows, and the perforations 100 in the end wall 54 are arrayed in generally radially directed rows. Overlying each row of perforations 110 in the inner, outer, and end walls 50, 52, 54 is a flattened Z-shaped splash strip 112. FIG. 6 illustrates one of the splash strips 112 attached to the inner wall 52, and is representative of the configuration of the strips 112 attached to the inner and outer walls 50, 52 as well. By virtue of the Z-shape of the splash strip, the compressed oxidant entering the combustion chamber 56 via the perforations 110 is caused to flow in a filmlike manner along the liner wall 52, as illustrated by arrow 114, to thereby provide convective cooling of the wall 52. Although it is possible to have the radially directed rows of perforations and splash strips extend radially inward of the mean radius 90, as shown in FIG. 6, I have found that improved performance and start reliability are provided if the cooling means on the end wall do not extend significantly radially inward of the mean radius 90, as shown in FIG. 2.

Figure 5:
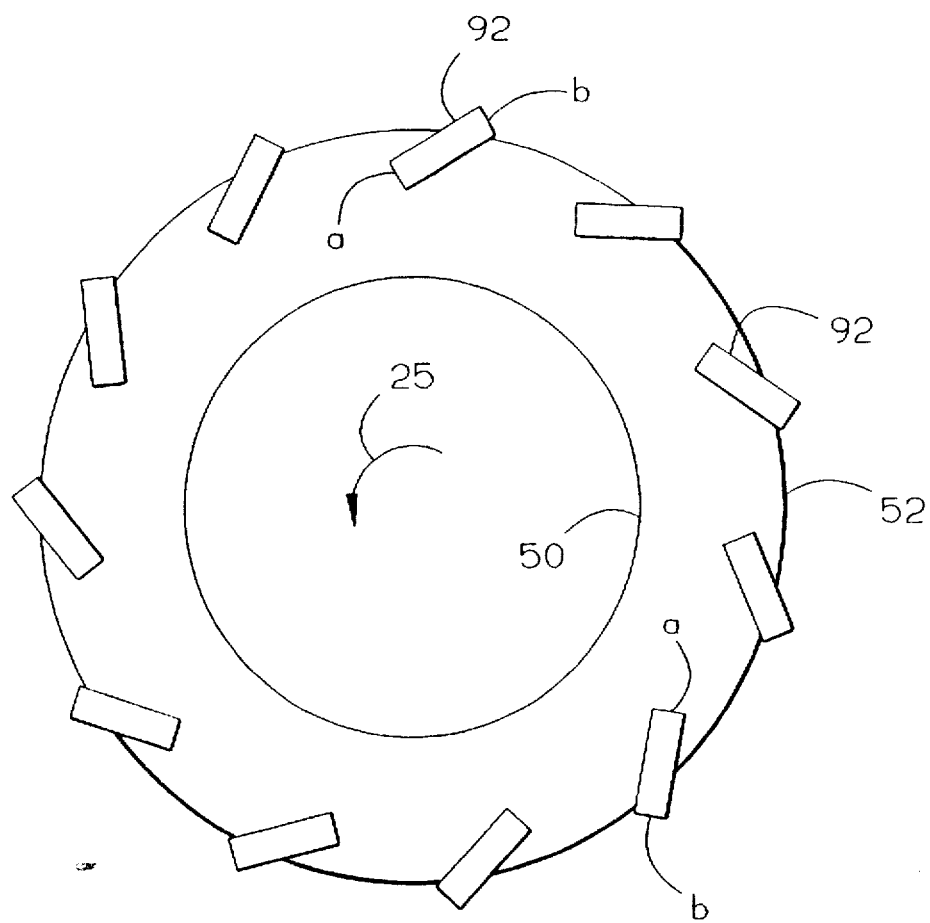
FIG. 5 is a schematic cross-sectional taken along Line 5—5 depicting air blast tubes extending through the outer wall of the liner.

As shown in FIGS. 2 and 3, the combustor 40 of the exemplary embodiment also includes secondary and tertiary oxidant inlets, in the form of a row of air blast tubes 92 (secondary inlets) in the outer wall 52, and rows of inlet holes 94, 96 (tertiary inlets) extending through the inner and outer walls of the liner 48. These secondary and tertiary oxidant inlets 92, 94, 96 are located in radially spaced circumferential arrays along transverse planes axially displaced in a downstream direction from the deflector jets 82 to create dynamic oxidant baffles 93, 95, 97 which substantially divide the combustion chamber 56 into a primary combustion zone 98, which extends from the end wall 54 to the blast tubes 92, a dilution zone 102 extending from the inlet holes 96, 98 to the outlet, and a secondary combustion zone which extends between the blast tubes 92 and the inlet holes 94, 96 in the outer and inner walls 50, 52 of the liner 48. The fuel and oxidant injecting means 62, the holes 80 with their associated deflector jets 82, and the recirculation zone 70 are all located within the primary combustion zone 56. As best seen in FIG. 5, the inner ends 'a' of the blast tubes 92 are skewed in the direction of rotation 25 in a manner similar to that previously described in relation to the fuel and oxidant inlets 62. The outer ends 'b' of the blast tubes 92 are open to receive compressed oxidant from the plenum chamber 60. The tubes are sized to inject the compressed oxidant into the combustor with sufficient tangential and radial velocity to cause mixing of the compressed oxidant injected through the blast tubes 92 with the circumferentially spiralling flow of hot gases of combustion as they travel through the secondary combustion zone 100 on their way to the outlet 44.

I have found that by carefully designing the various aspects of the invention described above such that the sum of the oxidant entering the primary combustion zone 98 via the air inlet tubes 64, the deflector jets 82, and the perforations 110 located within the primary combustion zone 98, is maintained in a substantially stoichiometric relationship to the amount of fuel injected via the fuel tube 66, the performance of the gas turbine engine 10 is improved. I have further found that optimal performance is achieved in some gas turbine engines having a construction similar to the exemplary embodiment of my invention described herein, by sequentially injecting the oxidant such that the primary, secondary and dilution zones 98, 100, 102 respectively receive about twenty-five percent, thirty percent, and the remainder of the total amount of compressed oxidant entering the combustor chamber 56 from the plenum chamber 60.

Although the particular percentages of oxidant entering each of the zones within the combustion chamber may be expected to vary to a greater or lesser degree depending upon the construction of a given combustor or engine, the amounts of oxidant and fuel entering the primary zone 98 of a combustor constructed according to my invention should preferably be maintained in a substantially stoichiometric ratio.

Thus far, I have endeavored to describe various aspects and features of my invention as separable elements or subgroups, such that certain basic geometric relationships related to the practice of my invention might be more readily understood. Those skilled in the art will understand, however, that as a result of these basic geometric relationships, certain advantageous functional interrelationships are also established between these elements or subgroups which further enhance the advantages provided by the previously discussed aspects of my invention.

Specifically, I have previously described the intersection of the deflector jets 82 and the circumferentially spiralling flow of fuel, oxidant and hot gases in terms of a single interaction in which the circumferentially spiralling flow is deflected in an upstream direction. Those skilled in the art will no doubt already have grasped the fact that, due to the general side-winding flow pattern within the liner 48, the circumferentially spiralling flow actually intersects multiple deflector jets 82 as the mixture of fuel, oxidant and hot gases of combustion circumferentially traverses the primary combustion zone 98. It will be further appreciated that the circumferentially spiralling flow must eventually traverse the primary zone in the downstream axial direction and flow past the deflector jets 82 in order to reach the outlet 44 of the combustor 40. Because the tangential component of motion 74 of the circumferentially spiralling flow is substantially higher than the axial component of motion, and because the spouting velocity of the deflector jet 82 must be high enough to penetrate into the interior of the combustion chamber 46, numerous interactions of the spiralling flow with each of the deflector jets 82 also occur. The circumferentially spiralling flow is thus subjected to multiple deflections by the deflector jets 82 as the spiralling flow traverses the primary zone 98 in both the circumferential and axial directions.

Figure 7C:
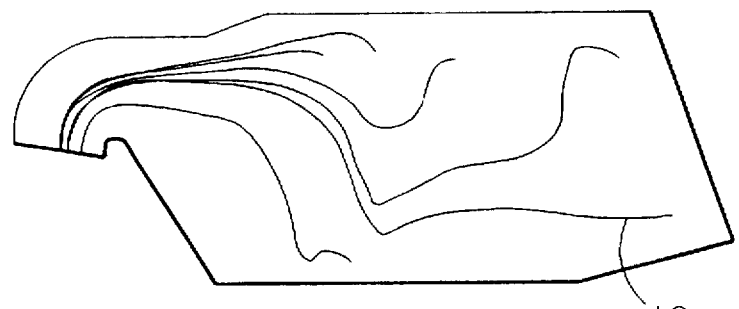
FIG. 7c is a particle plot of a prior art combustor.

As a result of these multiple interactions, my invention creates what is in effect a toroidal vortex shaped, recirculation flow pattern superimposed upon the circumferentially spiralling flow pattern within the primary combustion zone 98. FIGS. 7a and b will help to visualize these flow patterns.

In FIG. 7a, numbered plus signs "+" denote the "tail ends" of the tangentially directed components of successive passes of the circumferentially spiralling flow through a diametral plane of the combustor of FIG. 2. As depicted in FIG. 7a, the plane of the paper represents the diametral plane. If these "tail ends" are connected with a line, as shown in FIG. 7a, a particle path 116 is created depicting the axial movement of the circumferentially spiralling flow as it traverses the diametral plane within the primary combustion zone. FIG. 7a depicts, in simplified form, the toroidal recirculation flow pattern 116 created through practice of my invention. Each time the circumferentially spiralling flow passes a deflector jet during a circumferential traversal of the primary zone 98, it is deflected toward the end wall 54 of the liner 48. By strategically positioning and sizing the various constituent elements of my invention according to the general rules previously described herein, the axial component of motion of the circumferentially spiralling flow within the combustor is modulated during successive passes, by virtue of being deflected, such that the spiralling flow is swept axially back and forth and radially inward and outward while traversing the primary combustion zone 98. The radial movement is also caused to significant extent by centrifugal forces set up by the spiralling motion, and the effect of the dynamic oxidant barrier 93 issuing from the oxidant blast tubes 92. As a result of these factors, the recirculating flow pattern 116 is established about an "eye" 130 of the toroidal vortex flow 116.

Preferably, the fuel and oxidant injector means 64 are positioned and configured such that the combustible mixture of fuel and oxidant are tangentially injected directly into the eye 130 of the toroidal vortex 116. Within the eye 130, the axial velocity of the circumferentially spiralling flow is minimized. The fuel, oxidant and hot gases circulating circumferentially within the eye 130 are, in effect, traveling along in a combustion zone of virtually infinite length, until other effects, such as centrifugal forces, friction with the walls 50, 52, 54 of the liner 48, or fluid dynamic forces cause them to move out of the eye 130. Dwell time and combustion efficiency are thus significantly improved.

As will be recognized with reference to FIGS. 2 and 7a, the recirculation pattern is caused to rotate in a counter-clockwise direction, as shown in FIG. 7a, by strategically positioning the holes 80 downstream from the first transverse plane 68, and configuring the holes 80 and fuel and oxidant means such that the deflector jets 82 have sufficient spouting velocity to penetrate the circumferentially spiralling flow and intersect a portion of that spiralling flow below the mean radius 90 of the combustion chamber 56. The depicted counterclockwise rotation is desirable in that the centrifugal effects inherent in the circumferentially spiralling flow, in conjunction with the oxidant issuing from the blast jets 92 are also utilized to advantage in creating and sustaining the recirculation flow 116.

By directing the deflector jets 82 in the upstream axial direction, much less force is required to set the recirculation flow 116 in motion than would be required to achieve the same effect with say radially directed jets. This is so because the axial velocity, of the circumferentially spiralling flow is much less than the tangential velocity of the rapidly circulating sidewinding flow pattern. Hence, the force required to deflect the tangentially directed component would be much greater due to its greater velocity and momentum. As the recirculating flow 116 approaches the outer wall 52 of the liner 48 and attempts to move toward the outlet 44, it encounters not only the deflector jets 82, but also the dynamic oxidant baffle 93 created by the blast tubes 92. Due to the substantial percentage of oxidant injected by the blast tubes 92 and deflector jets 82, in comparison to the flow of gases trying to exit the primary zone 98, the circumferentially spiralling flow cannot easily penetrate the dynamic oxidant baffle 93 created by the blast tubes 92. The circumferentially spiralling flow is thus forced to flow radially inward in moving toward the outlet 44, thereby further reinforcing the recirculating flow pattern 116.

Figure 7B:
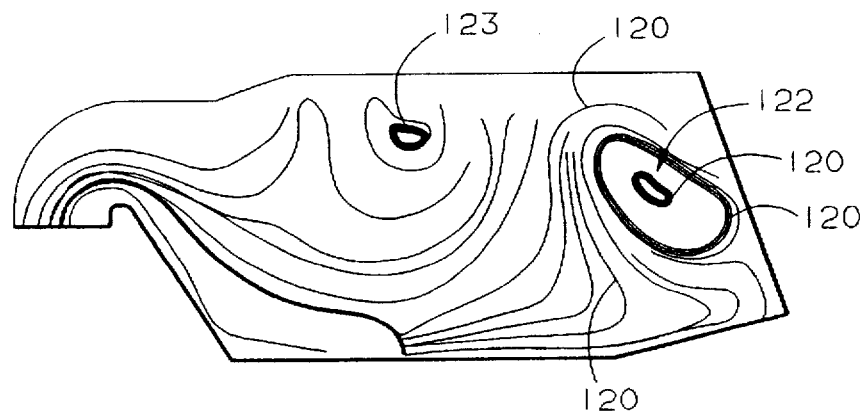
FIGS. 7a–b are particle plots illustrating recirculating flow patterns within the combustor of FIGS. 1–6.
Figure 7A:
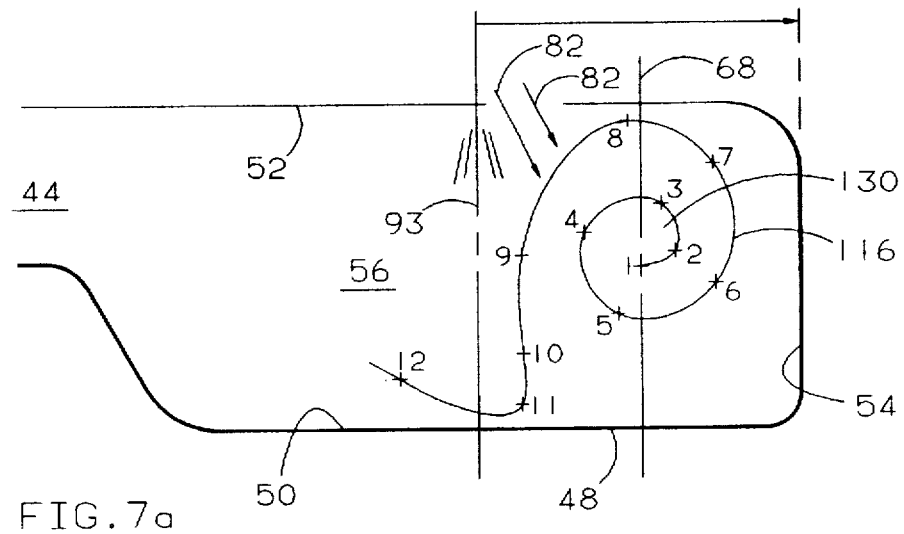

FIG. 7b is a computer generated particle trace for the combustor of the exemplary embodiment of the invention as depicted in FIGS. 1–6. A recirculating flow pattern 120, and an eye 122 of the toroidal vortex flow analogous to flow pattern 116 and eye 130 of FIG. 7a are clearly visible. Also visible is a second recirculation flow 123 within the secondary combustion zone 100. The recirculation flow 120, adjacent the endwall 54, fills much of the primary combustion zone 98. This recirculation significantly improves flame stability under adverse conditions, such as cold starts at high altitudes. As a result of this circulation, for example, reliable starts and stable flames may be achieved at altitudes in excess of forty thousand feet with a combustor according to my invention. The second recirculation flow 123 provides additional improvements in combustion efficiency. Both recirculation flows 120, 123 serve to increase residence time of the fuel within the combustion chamber 56.

By way of contrast, FIG. 7c shows a prior sidewinding combustor, similar in construction to the exemplary embodiment but without, inter alia, the deflector jets of the exemplary embodiment. As seen in FIG. 7c, the particle traces 12e of the prior combustor exhibit no recirculation flow as in the combustor of my invention.

Figure 8A:
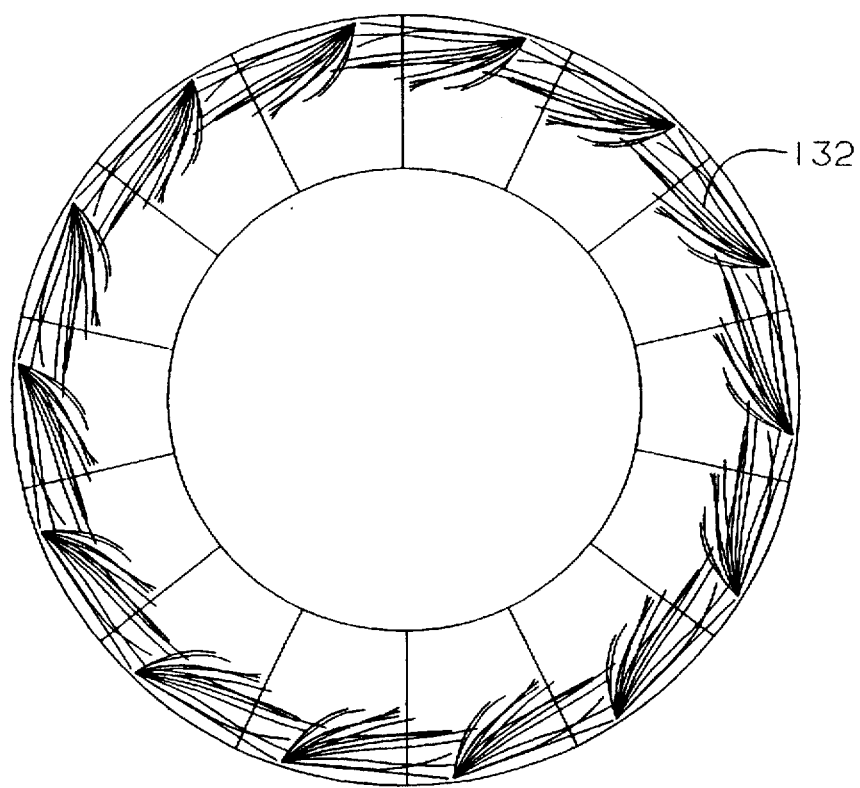
FIGS. 8a and b are schematic representations of fuel droplet trajectories in the combustor of FIGS. 1–6.
Figure 8B:
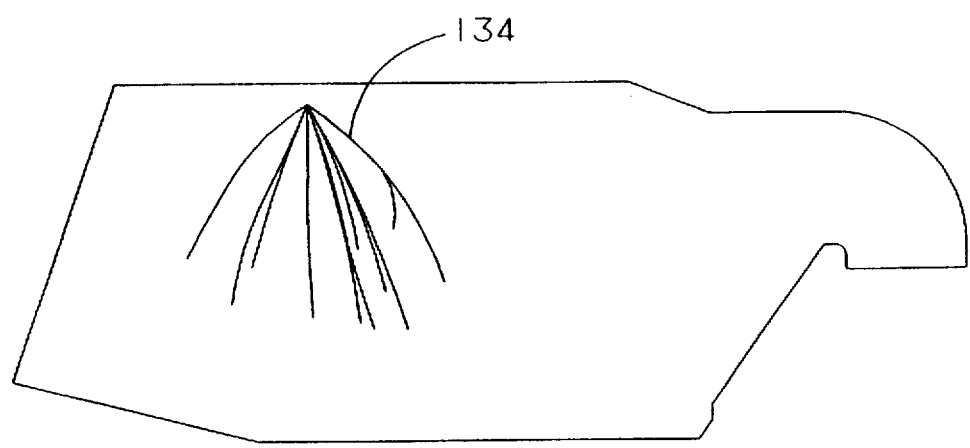
FIGS. 8c and d are schematic representations of fuel droplet trajectories in a prior art combustor.
Figure 8C:
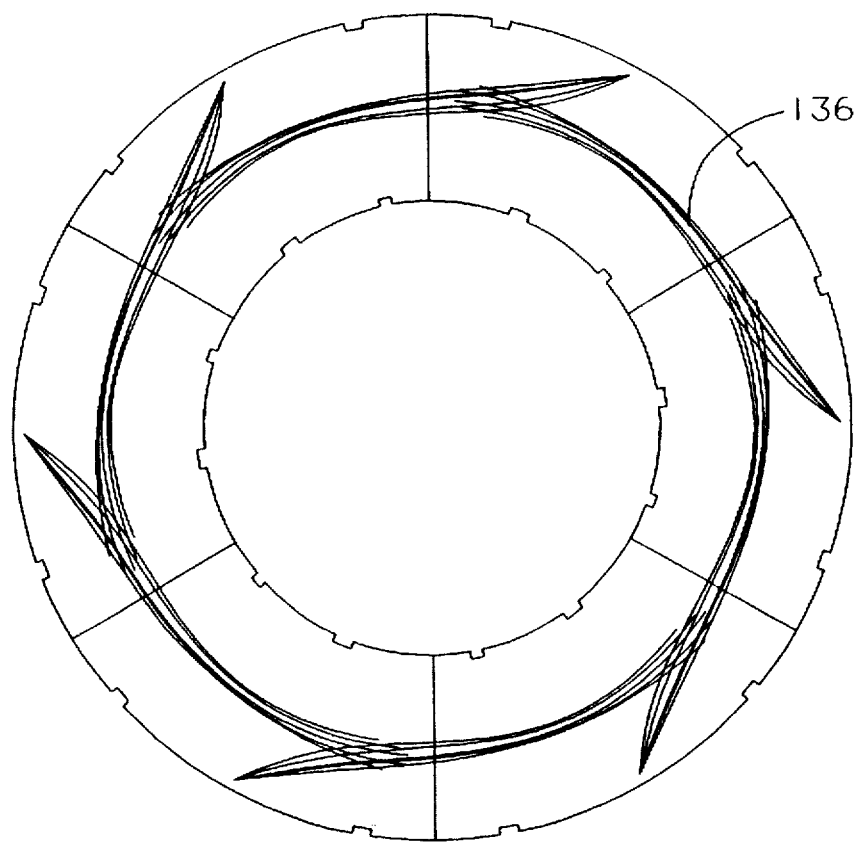
Figure 8D:
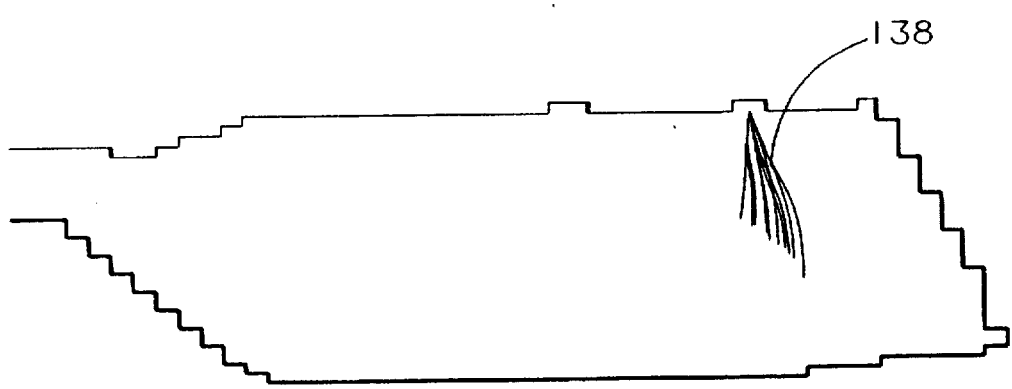

The deflector jets 82 and recirculation zone 116, 120 of my invention also promote atomization of liquid fuel as shown in FIGS. 8a–d. FIGS. 8a and b depict fuel droplet trajectories 132,134 in a combustor according to the invention, and FIGS. 8c and d depict fuel droplet trajectories 136, 138 in a prior art sidewinding combustor without the deflector jets 82 and recirculating flow 116, 120 of my invention. By comparing the fuel FIGS. 8a and b with 8c and d respectively, it is readily apparent that a combustor according to my invention provides superior atomization. This is the result of the direct axial impingement of the deflector jet 82 on the atomized fuel stream 75, and superior mixing provided by the recirculating flow pattern 116, 120.

Those skilled in the art will readily recognize that a combustor, an engine, or a vehicle incorporating some or all of the various structural and functional aspects of my invention, or the novel methods for controlling the sequential injection of the oxidant as taught herein, offers a number of additional advantages and improvements in comparison to previously known combustors or engines. By providing the recirculation zone 70 and the deflector jets 82 for deflecting the tangentially directed stream of fuel and oxidant 75 in a direction opposite the outlet 44 of the combustor 40, dwell time of the reactants within the primary combustion zone 98 is increased, thereby increasing the time available for achieving complete combustion, without resorting to increasing the physical size of the combustor. Combustion efficiency is also enhanced by improved mixing of the burned and unburned fuel and oxidant.

As a result of the increased combustion efficiency provided by my invention, the combustion process is virtually completed within the primary combustion zone. Any small pockets of unburned fuel remaining within the spiralling flow of hot gases exiting the primary combustion zone are effectively and efficiently burned within the long spiralling path which the gases are forced to follow in traversing the secondary combustion zone. There is thus no need to add the additional fuel injectors which were required in some prior combustors for sequentially injecting fuel into one or more secondary combustion zones in order to obtain complete combustion.

Figure 9A:
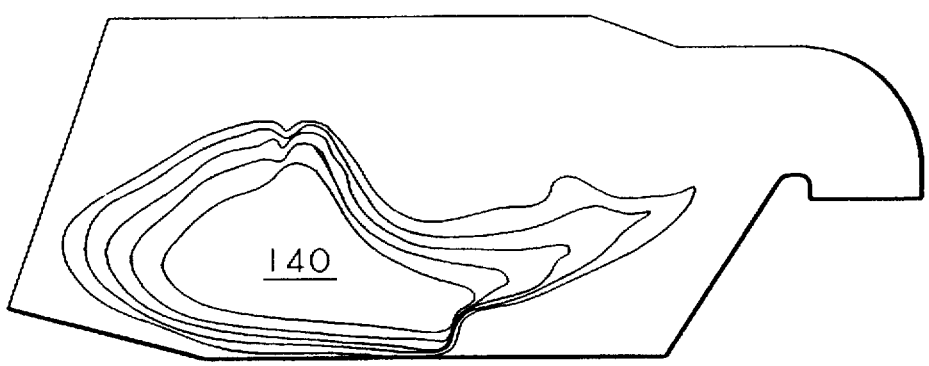
FIG. 9a is a plot of mean temperatures within the combustor of FIGS. 1–6.

Confining the combustion process to the primary combustion zone provides the additional benefit of allowing the remaining volume within the combustor to be utilized for mixing and dilution operations. As shown in FIG. 9a, through the practice of my invention, a highly desirable mean temperature profile is provided in which a well defined circumferentially uniform flame zone 140 is provided. The flame zone 140 is located in the center of the combustor, and is not too close to any of the walls 50, 52, 54. There is a strong cold layer along the walls to prevent overheating. Since the flame zone 140 is confined to the primary combustion zone, the reminder of the combustion chamber 56 volume is available for mixing and dilution of the hot gases of combustion. As a result, a more uniform outlet temperature profile is achieved, thereby increasing the reliability and operational life of downstream components, such as the turbine wheel 27 of the exemplary embodiment.

By utilizing straight-sided holes wherever possible for oxidant inlets, instead of the more costly directional blast tubes or vanes required in prior combustors, I have defined a compact combustor which may be readily produced at low cost by mass production methods.

Although the present invention has been described in considerable detail with reference to certain preferred embodiments thereof, other embodiments are possible.

Figure 9B:
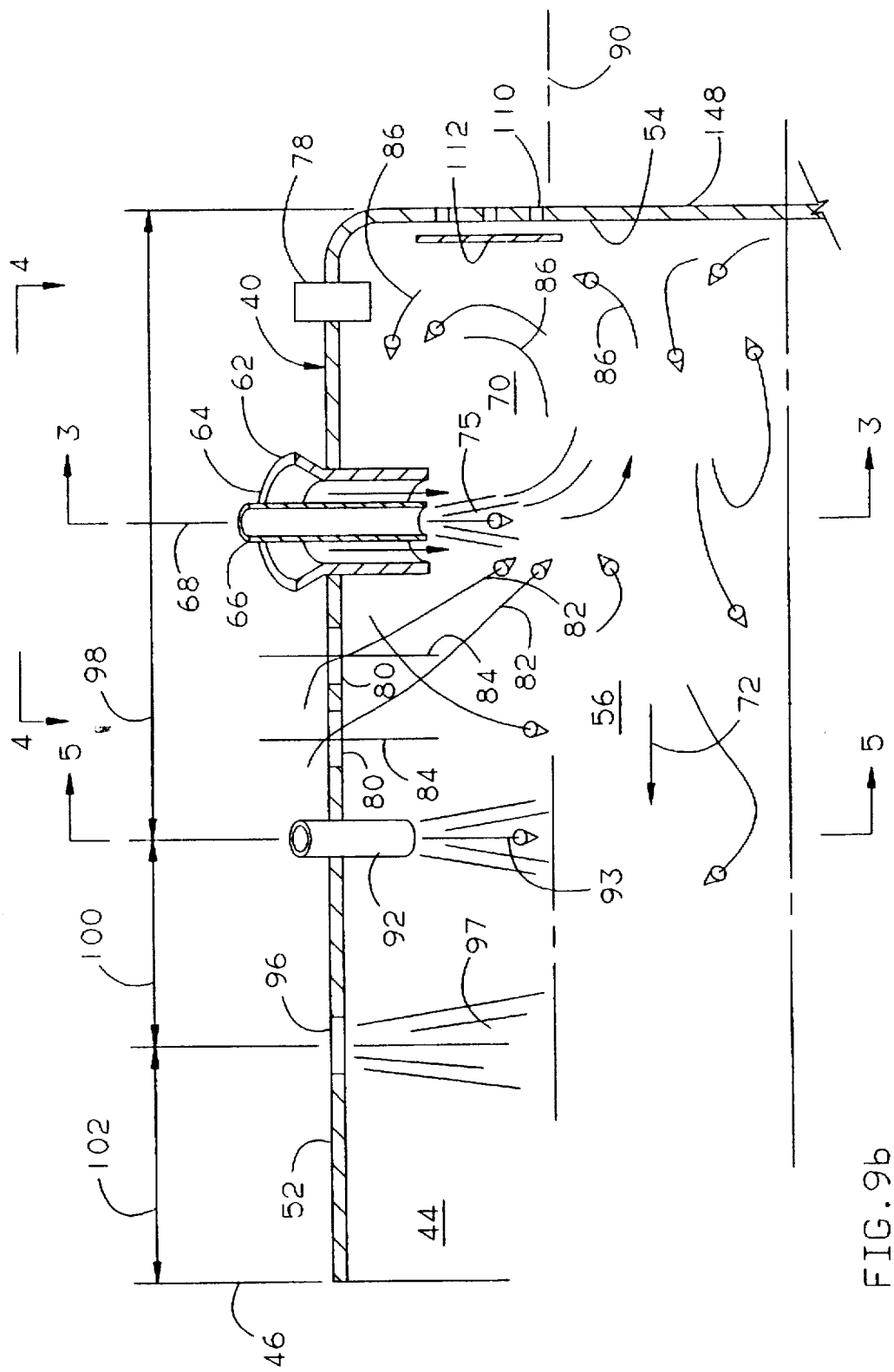
FIG. 9b is a partial cross sectional view of a cylindrical combustor according to the invention.

For instance:
a) The combustor could be cylindrical rather than annular as shown at 148 in FIG. 9b;
b) Fewer or greater numbers or secondary and tertiary oxidant inlets could be employed;
c) Secondary and tertiary inlets could be located in either the inner or outer walls, and could be equipped, or not, with flow directive devices such as the blast tubes 92; or
d) The gas turbine engine could be a thrust engine.

Therefore, the spirit and scope of the appended claims should not be limited to the description of the preferred versions contained herein.

I claim:

1. A method for combusting fuel in a combustor defining an annular combustion chamber disposed about an axis, with said combustion chamber having a primary combustion zone at an upstream axial end thereof, an outlet at a downstream axial end thereof, and a secondary combustion zone between said primary combustion zone and said outlet, said method comprising the steps of:

(a) injecting streams of fuel and oxidant into said primary combustion zone;

(b) mixing said streams to form a combustible mixture of fuel and oxidant;

(c) combusting said mixture in a manner producing a generally circumferentially spiraling annular flow of said fuel, oxidant, and hot gases of combustion within said primary combustion zone, emanating from a point of injecting said streams of fuel and oxidant into said primary combustion zone and extending generally in a downstream direction toward said outlet, with said spiraling annular flow having components of motion in both a downstream axial and a tangential direction;

(d) injecting a deflecting stream of oxidant, having at least a component of motion in an upstream direction, into said primary combustion zone and across said circumferentially spiraling flow such that said downstream axial component of motion of said circumferentially spiraling flow is reduced, thereby improving combustion efficiency and reducing emissions of the combustor by increasing dwell time of the fuel, oxidant, and hot gases of combustion within the primary combustion chamber, (e) injecting a secondary stream of oxidant into said secondary combustion zone through a plurality of blast tubes extending tangentially into said secondary combustion zone to create a dynamic oxidant baffle to impede the downstream axial component of motion of the circumferentially spiraling flow, to thereby improve combustion efficiency and reduce emissions of the combustor by increasing dwell time of the fuel oxidant, and hot gases of combustion within the secondary combustion zone.

2. The method of claim 1 wherein said stream of fuel is injected into said combustion zone in a direction generally tangential to said annular combustion chamber.

3. The method of claim 1 wherein said stream of oxidant is injected into said combustion zone in a direction generally tangential to said annular combustion chamber.

4. The method of claim 1 wherein said streams of fuel and oxidant are injected in a concentric manner along a common axis oriented generally tangentially to the annular combustion chamber.

5. The method of claim 1 wherein said streams of fuel and oxidant are injected at rates of flow which produce a substantially stoichiometric ratio of said fuel and oxidant in said mixture.

6. The method of claim 1 wherein the combustor includes a radially outer wall and said step (a) is accomplished by injecting said stream of fuel through said radially outer wall and into said combustion zone in a direction generally tangential to said annular combustion chamber.

7. The method of claim 1 wherein the combustor includes a radially outer wall and said step (a) is accomplished by injecting said streams of fuel and oxidant through said radially outer wall.

8. The method of claim 1 wherein the combustor includes a radially outer wall and said step (a) is accomplished by injecting said stream of fuel through said radially outer wall.

9. The method of claim 8 wherein step (d) is accomplished by injecting said deflecting stream of oxidant through said radially outer wall.

10. The method of claim 7 wherein step (d) is accomplished by injecting said deflecting stream of oxidant through said radially outer wall.

11. A combustor comprising:
a liner having a generally annular shaped outer wall disposed about an axis and closed at one axial end thereof by a radially extending end wall to define a generally cylindrical or annular shaped combustion chamber having an upstream axial end thereof closed by said end wall, and an opposite downstream end thereof open to define an outlet of the combustor;
fuel and oxidant injector means for injecting streams of fuel and oxidant into said combustion chamber and mixing said streams to form a combustible mixture of said fuel and oxidant;
means for combusting said mixture in a manner producing a generally circumferentially spiraling flow of said fuel, oxidant, and hot gases of combustion emanating at said fuel injector means and extending generally in a downstream direction toward said outlet of the combustor, with said circumferentially spiraling flow having a component of flow in a downstream axial direction;
deflector jet means for directing a deflecting jet of oxidant, having at least a component of motion in a generally upstream axial direction toward said end wall, across said generally circumferentially spiraling flow in such a manner that the downstream axial component of motion of the circumferentially spiraling flow is diminished; and
means for creating a dynamic oxidant baffle downstream of said deflector jet means for impeding said downstream axial flow component of said circumferentially spiraling flow and thereby improving combustion efficiency and reducing emissions of the combustor by increasing dwell time of the fuel, oxidant, and hot gases of combustion within said combustion chamber.

12. The combustor of claim 11 wherein the fuel injection means are circumferentially disposed in a first transverse plane adjacent the end wall, and the deflector jet means are disposed in a second transverse plane displaced axially downstream from said first plane toward said outlet.

13. The combustor of claim 12 wherein the fuel injection means are configured to inject said stream of fuel in a direction generally tangential to said combustion chamber.

14. The combustor of claim 11 wherein the fuel injection means are configured to inject said stream of fuel in a direction generally tangential to said combustion chamber.

15. The combustor of claim 11 wherein the fuel injection means extend through the outer wall of the liner.

16. The combustor of claim 15 wherein the fuel injection means are circumferentially disposed in a first transverse plane adjacent the end wall, and the deflector jet means are disposed in a second transverse plane displaced axially downstream from said first plane toward said outlet.

17. The combustor of claim 16 wherein the fuel injection means are configured to inject said stream of fuel in a direction generally tangential to said combustion chamber.

18. The combustor of claim 15 wherein the fuel injection means are configured to inject said stream of fuel in a direction generally tangential to said combustion chamber.

19. The combustor of claim 15 wherein said liner is immersed in pressurized oxidant, and said deflector jet means are defined by apertures extending through said outer wall, thereby providing fluid communication for the passage of said pressurized oxidant into said combustion chamber.

20. The combustor of claim 19 wherein said pressurized oxidant flows along a radially outer surface of said outer wall of said liner, with at least a component of motion of said pressurized oxidant being directed in an upstream axial direction from said outlet toward said end wall, and wherein said component of motion in said upstream axial direction contributes substantially to diminishing said downstream axial component of motion of the circumferentially spiraling flow.

21. The combustor of claim 20 wherein said pressurized oxidant further has a generally circumferentially directed component of motion which contributes substantially to causing said stream of oxidant to cross said circumferential spiraling flow.

22. The combustor of claim 11 further including cooling means for injecting oxidant along a wall of said liner, and wherein a total amount of oxidant injected by all of said oxidant injector means, deflector jets, and said cooling means constitutes a substantially stoichiometric ratio of oxidant in relation to a total amount of fuel injected by said fuel injection means.

23. The combustor of claim 11 wherein:
the fuel injection means are circumferentially disposed in a first transverse plane adjacent the end wall but axially spaced therefrom in a downstream direction to form a recirculation zone between said end wall and said first transverse plane for recirculating a portion of said circumferentially spiralling flow therein;
the deflector jet means are disposed in a second transverse plane displaced axially downstream from said first plane toward said outlet; and
said downstream axial component is sufficiently diminished by said deflecting jet of oxidant to cause a portion of said circumferentially spiralling flow of fuel, oxidant, and hot gases of combustion to recirculate within said recirculation zone.

24. The combustor of claim 23 wherein the fuel injection means are configured to inject said stream of fuel in a direction generally tangential to said combustion chamber.

25. The combustor of claim 23 wherein the fuel injection means extend through the outer wall of the liner.

26. The combustor of claim 11 wherein said liner is immersed in pressurized oxidant, and said deflector jet means are defined by apertures extending through one of said walls of said liner, thereby providing fluid communication for the passage of said pressurized oxidant into said combustion chamber.

27. The combustor of claim 26, wherein said fuel injection means and deflector jet means extend through the outer wall of the liner, with said fuel injection means being circumferentially disposed in a first transverse plane adjacent the end wall, and said deflector jet means being disposed in a second transverse plane displaced axially downstream from said first plane toward said outlet.

28. The combustor of claim 27 wherein said fuel injection means and deflector jet means are disposed along circumferentially spaced diametral planes passing through said fuel injection means at a point of intersection of said fuel injection means with said outer wall of the liner.

29. The combustor of claim 27 wherein said fuel injector means are disposed along circumferentially spaced first diametral planes passing through said fuel injector means at a point of intersection of said fuel injector means with said outer wall of the liner and said deflector jet means are disposed along circumferentially spaced second diametral planes which are circumferentially skewed from said first diametral planes passing through said fuel injector means.

30. The combustor of claim 29 wherein said pressurized oxidant has a swirl component of flow in a generally tangential direction, and said second diametral planes passing through said deflector jet means are circumferentially skewed, in relation to said first diametral planes passing through said fuel injection means, in a direction opposite the tangential direction of said swirl component of flow.

31. The combustor of claim 29 wherein said pressurized oxidant has an upstream axially directed component motion toward said end wall, and said deflector jet means provide fluid communication through said outer wall of said liner in a manner allowing said upstream axial component of motion outside of said liner to be substantially maintained within the liner and utilized for deflecting said circumferentially spiralling flow of oxidant toward said end wall.

32. The combustor of claim 29 wherein said liner further includes an inner wall about said axis which is closed at one axial end thereof by said end wall to define said annular combustion chamber said liner defines a mean radius of said combustion chamber disposed halfway between said inner and said outer walls, and said deflector jet means are configured and oriented such that said deflector jet intersects said circumferentially spiraling flow at a point radially inward of said mean radius of the combustion chamber.

33. The combustor of claim 29 further including cooling means for injecting a cooling film of oxidant along one or more of said walls of said liner, and wherein a total amount of oxidant injected by all of said oxidant injector means, deflector jets, and said cooling means constitutes a substantially stoichiometric ratio of oxidant in relation to a total amount of fuel injected by said fuel injector means.

34. The combustor of claim 29 wherein:
said combustor further includes cooling means for injecting a cooling film of oxidant along one or more of said walls of said liner, and said means for creating a dynamic oxidant baffle includes secondary oxidant inlets extending through one or more of the walls of said liner and disposed along a third transverse plane axially displaced in the downstream direction from said second transverse plane to create said dynamic oxidant baffles which function to segregate that portion of the combustion chamber extending substantially from the end wall to the third transverse plane into a primary combustion zone, including therein said fuel and oxidant injector means, the deflector jets, and a portion of said cooling means; and
wherein a total amount of oxidant injected into said primary combustion zone by all of said oxidant injector means, deflector jets, and said portion of said cooling means within said primary combustion zone constitutes a substantially stoichiometric ratio of oxidant in comparison to a total amount of fuel injected into said primary combustion zone by said fuel injection means.

35. The combustor of claim 34 wherein:
said combustor further includes tertiary oxidant inlets extending through one or more of the walls of said liner and disposed along a fourth transverse plane axially displaced in the downstream direction from said third transverse plane to create dynamic oxidant baffles which function to further subdivide the combustion chamber downstream from the primary combustion zone into a secondary combustion zone extending substantially between the third and fourth transverse planes, and a dilution zone extending substantially between the fourth transverse plane and the outlet of the combustion chamber; and
wherein the total amounts of oxidant respectively entering the primary, secondary, and dilution zones of the combustion chamber are controlled to about twenty-five percent, thirty percent, and the remainder of one hundred percent of the pressurized oxidant entering the combustion chamber.

36. The combustor of claim 35 wherein said pressurized oxidant has a swirl component of flow in a generally tangential direction, and wherein said secondary oxidant inlets are provided in the form of a row of oxidant blast tubes radially spaced in a circumferential array along the third transverse plane and extending through the outer wall of the liner to provide a passage for said pressurized oxidant surrounding said liner to enter the combustion zone, with said oxidant blast tubes having radially inner ends disposed within the combustion chamber and skewed in the direction of said swirl component of flow.

37. The combustor of claim 35 wherein said liner of said combustor further includes an annular shaped inner wall extending in an upstream direction from said outlet and spaced radially inward from said outer wall, and said end wall is a generally radially extending annular wall connecting said inner and outer walls at an upstream end thereof, such that said combustion chamber is annular shaped, and further wherein said tertiary inlets are provided by holes extending through the inner and outer walls of the liner along said fourth transverse plane.

38. In a gas turbine engine comprising:
a compressor including a compressor wheel mounted for rotation about an axis within a housing defining an axially facing, annular shaped compressor outlet, said compressor wheel having compressor blades for providing an annular flow of compressed oxidant through said compressor outlet when said compressor wheel is rotated in a direction of rotation about said axis, said annular flow having both an axially directed component of motion and a tangentially directed swirl component of motion in said direction of rotation of the compressor wheel;

a turbine including a turbine wheel having turbine blades, and a nozzle adjacent said turbine blades, said nozzle being adapted to receive hot gases of combustion and to direct said hot gases of combustion at said turbine blades to cause rotation of said turbine wheel about said axis; and drive means for operatively coupling said compressor wheel to said turbine wheel in such a manner that said drive means will cause said compressor wheel to rotate about said axis when said turbine is supplied with said hot gases of combustion;

a reverse-flow annular combustor for combusting fuel and oxidant to provide said hot gases of combustion, said combustor comprising:
an annular inlet disposed about said axis for receiving said annular flow of oxidant from said compressor, and an annular outlet disposed about said axis for delivering a flow of said hot gases of combustion to said nozzle, with said inlet and outlet being disposed in a substantially coplanar relationship within a common transversely oriented input/output plane at one axial end of said combustor, said inlet being disposed radially outward of said outlet;

a liner having generally annular shaped, radially spaced, inner and outer walls extending axially from said outlet and connected at an opposite, upstream axial end of said combustor by a radially extending wall, such that said liner defines an annular combustion chamber disposed about said axis and terminating at a downstream end thereof in said annular outlet leading to said nozzle;

a housing extending from said inlet and surrounding said liner in a spaced relationship to define a plenum chamber between said housing and said liner for directing said annular flow of compressed oxidant about said liner;

fuel and oxidant injector means extending through one or more of said walls of said liner for injecting one or more streams of fuel and one or more streams of compressed oxidant from said plenum chamber into said combustion chamber and mixing said streams to form a combustible mixture of said fuel and oxidant, with said fuel injector means being configured to inject fuel into said combustion chamber along a first transverse plane adjacent said end wall and in a generally tangential direction substantially matching the direction of rotation of the compressor wheel;

ignitor means for igniting and combusting said mixture in a manner producing a generally circumferentially spiraling flow of said fuel, oxidant, and hot gases of combustion emanating at said fuel injector means and extending generally in a downstream direction toward said outlet of the combustor, with said circumferentially spiraling flow having components of flow in both a downstream axial direction and a tangential direction substantially matching the direction of rotation;

deflector jet means extending through one of said walls of said liner for injecting a portion of said annular flow of oxidant, in the form of a deflector jet having at least a component of motion in a generally upstream axial direction toward said end wall of said liner, and intersecting said generally circumferentially spiraling flow of fuel, oxidant, and hot gases of combustion in such a manner that the downstream axial component of motion of the circumferentially spiraling stream is deflected toward said end wall and said axial component of motion of said circumferentially spiraling flow is diminished, thereby increasing dwell time of the hot gases of combustion within the combustion chamber to provide improved combustion efficiency and reduced emissions; and means for creating a dynamic oxidant baffle downstream of said deflector jet means for impeding said downstream axial flow component of said circumferentially spiraling flow and thereby improving combustion efficiency and reducing emissions of the combustor by increasing dwell time of the fuel, oxidant, and hot gases of combustion within said combustion chamber.

39. The gas turbine engine of claim 38 wherein said deflector jet means extend through the outer wall of the liner.

40. The gas turbine engine of claim 38 wherein said deflector jet means are disposed in a second transverse plane displaced axially downstream from said first plane toward said outlet.

41. The combustor of claim 38 wherein said fuel injection means and deflector jet means extend through the outer wall of the liner, with said fuel injection means being circumferentially disposed in said first transverse plane adjacent the end wall, and said deflector jet means being disposed in a second transverse plane displaced axially downstream from said first plane toward said outlet.

42. The combustor of claim 41 wherein said fuel injection means are disposed along circumferentially spaced first diametral planes passing through said fuel injection means at a point of intersection of said fuel injection means with said outer wall of the liner and said deflector jet means are disposed along circumferentially spaced second diametral planes which are circumferentially skewed from said first diametral planes passing through said fuel injection means.

43. The combustor of claim 41 wherein said fuel injector means are disposed along circumferentially spaced first diametral planes passing through said fuel injector means at a point of intersection of said fuel injector means with said outer wall of the liner and said deflector jet means are disposed along circumferentially spaced second diametral planes which are circumferentially skewed from said first diametral planes passing through said fuel injection means.

44. The gas turbine engine of claim 43 wherein said second diametral planes passing through said deflector jet means are circumferentially skewed in a direction opposite the direction of rotation of the compressor wheel from said first diametral planes passing through said fuel injection means.

45. The gas turbine engine of claim 41 wherein said axially directed component of the annular flow of compressed oxidant within said plenum chamber is in an upstream axial direction toward said end wall, and said deflector jet means provide fluid communication through said outer wall of said liner in a manner allowing said component of motion in the upstream direction of said compressed oxidant in said plenum chamber to be substantially maintained within the liner and utilized for deflecting said circumferentially spiralling flow of oxidant toward said end wall.

46. The combustor of claim 38 further including cooling means for injecting a cooling film of oxidant along one or more of said walls of said liner, and wherein a total amount of oxidant injected by all of said oxidant injection means, deflector jets, and said cooling means constitutes a substantially stoichiometric ratio of oxidant in relation to a total amount of fuel injected by the fuel injection means.

47. The combustor of claim 38 wherein:

said combustor further includes cooling means for injecting a cooling film of oxidant along one or more of said walls of said liner, and said means for creating a dynamic oxidant baffle includes secondary oxidant inlets extending through one or more of the walls of said liner and disposed along a third transverse plane axially displaced in the downstream direction from said second transverse plane to create said dynamic oxidant baffles which function to segregate that portion of the combustion chamber extending substantially from the end wall to the third transverse plane into a primary combustion zone, including therein said fuel and oxidant injector means, the deflector jets, and a portion of said cooling means; and wherein a total amount of oxidant injected into said primary combustion zone by all of said oxidant injection means, deflector jets, and said portion of said cooling means within said primary combustion zone constitutes a substantially stoichiometric ratio of oxidant in comparison to a total amount of fuel injected into said primary combustion zone by said fuel injection means.

48. In a gas turbine engine comprising:

a compressor including a compressor wheel mounted for rotation about an axis within a housing defining an axially facing, annular shaped compressor outlet, said compressor wheel having compressor blades for providing an annular flow of compressed oxidant through said compressor outlet when said compressor wheel is rotated in a direction of rotation about said axis, said annular flow having both an axially directed component of motion and a tangentially directed swirl component of motion in said direction of rotation of the compressor wheel;

a turbine including a turbine wheel having turbine blades and a nozzle adjacent said turbine blades, said nozzle being adapted to receive hot gases of combustion and to direct said hot gases of combustion at said turbine blades to cause rotation of said turbine wheel about said axis; and drive means for operatively coupling said compressor wheel to said turbine wheel in such a manner that said drive means will cause said compressor wheel to rotate about said axis when said turbine is supplied with said hot gases of combustion;

a reverse-flow annular combustor for combusting fuel and oxidant to provide said hot gases of combustion, said combustor comprising:

an annular inlet disposed about said axis for receiving said annular flow of oxidant from said compressor, and an annular outlet disposed about said axis for delivering a flow of said hot gases of combustion to said nozzle, with said inlet and outlet being disposed in a substantially coplanar relationship within a common transversely oriented input/output plane at one axial end of said combustor, said inlet being disposed radially outward of said outlet;

a liner having generally annular shaped, radially spaced, inner and outer walls extending axially from said outlet and connected at an opposite, upstream axial end of said combustor by a radially extending wall, such that said liner defines an annular combustion chamber disposed about said axis and terminating at a downstream end thereof in said annular outlet leading to said nozzle;

a housing extending from said inlet and surrounding said liner in a spaced relationship to define a plenum chamber between said housing and said liner for directing said annular flow of compressed oxidant about said liner;

fuel and oxidant injector means extending through one or more of said walls of said liner for injecting one or more streams of fuel and one or more streams of compressed oxidant from said plenum chamber into said combustion chamber and mixing said streams to form a combustible mixture of said fuel and oxidant, with said fuel injector means being configured to inject fuel into said combustion chamber along a first transverse plane adjacent said end wall and in a generally tangential direction substantially matching the direction of rotation of the compressor wheel;

ignitor means for igniting and combusting said mixture in a manner producing a generally circumferentially spiraling flow of said fuel, oxidant, and hot gases of combustion emanating at said fuel injector means and extending generally in a downstream direction toward said outlet of the combustor, with said circumferentially spiraling flow having components of flow in both a downstream axial direction and a tangential direction substantially matching the direction of rotation; and deflector jet means extending through one of said walls of said liner for injecting a portion of said annular flow of oxidant, in the form of a deflector jet having at least a component of motion in a generally circumferentially spiraling flow of fuel oxidant and hot gases of combustion in such a manner that the downstream axial component of motion of the circumferentially spiraling stream is deflected toward said end wall and said axial component of motion of said circumferentially spiraling flow is diminished, thereby increasing dwell time of the hot gases of combustion within the combustion chamber to provide improved combustion efficiency and reduced emissions, said deflector jet means being provided by holes extending through the outer wall of the liner and having generally straight radially directed cylindrical sidewalls disposed about centerlines directed radially through the axis.

49. In a gas turbine engine comprising:

a compressor including a compressor wheel mounted for rotation about an axis within a housing defining an axially facing, annular shaped compressor outlet, said compressor wheel having compressor blades for providing an annular flow of compressed oxidant through said compressor outlet when said compressor wheel is rotated in a direction of rotation about said axis, said annular flow having both an axially directed component of motion and a tangentially directed swirl component of motion in said direction of rotation of the compressor wheel;

a turbine including a turbine wheel having turbine blades, and a nozzle adjacent said turbine blades, said nozzle being adapted to receive hot gases of combustion and to direct said hot gases of combustion at said turbine blades to cause rotation of said turbine wheel about said axis; and drive means for operatively coupling said compressor wheel to said turbine wheel in such a manner that said drive means will cause said compressor wheel to rotate about said axis when said turbine is supplied with said hot gases of combustion;

a reverse-flow annular combustor for combusting fuel and oxidant to provide said hot gases of combustion, said combustor comprising;

an annular inlet disposed about said axis for receiving said annular flow of oxidant from said compressor, and an annular outlet disposed about said axis for delivering a flow of said hot gases of combustion to said nozzle, with said inlet and outlet being disposed in a substantially coplanar relationship within a common transversely oriented input/output plane at one axial end of said combustor, said inlet being disposed radially outward of said outlet;

a liner having generally annular shaped, radially spaced, inner and outer walls extending axially from said outlet and connected at an opposite, upstream axial end of said combustor by a radially extending wall, such that said liner defines an annular combustion chamber disposed about said axis and terminating at a downstream end thereof in said annular outlet leading to said nozzle, wherein said liner further defines a mean radius of said combustion chamber disposed halfway between said inner and outer walls;

housing extending from said inlet and surrounding said liner in a spaced relationship to define a plenum chamber between said housing and said liner for directing said annular flow of compressed oxidant about said liner;

fuel and oxidant injector means extending through one or more of said walls of said liner for injecting one or more streams of fuel and one or more streams of compressed oxidant from said plenum chamber into said combustion chamber and mixing said streams to form a combustible mixture of said fuel and oxidant, with said fuel injector means being configured to inject fuel into said combustion chamber along a first transverse plane adjacent said end wall and in a generally tangential direction substantially matching the direction of rotation of the compressor wheel;

ignitor means for igniting and combusting said mixture in a manner producing a generally circumferentially spiraling flow of said fuel oxidant and hot gases of combustion emanating at said fuel injector means and extending generally in a downstream direction toward said outlet of the combustor, with said circumferentially spiraling flow having components of flow in both a downstream axial direction and a tangential direction substantially matching the direction of rotation; and deflector jet means extending through one of said walls of said liner for injecting a portion of said annular flow of oxidant, in the form of a deflector jet having at least a component of motion in a generally circumferentially spiraling flow of fuel, oxidant, and hot gases of combustion in such a manner that the downstream axial component of motion of the circumferentially spiraling stream is deflected toward said end wall and said axial component of motion of said circumferentially spiraling flow is diminished, thereby increasing dwell time of the hot gases of combustion within the combustion chamber to provide improved combustion efficiency and reduced emissions, said deflector jet means being configured and oriented such that said deflector jet intersects said circumferentially spiraling flow at a point radially inward of said mean radius of the combustion chamber.

50. In a gas turbine engine comprising:

a compressor including a compressor wheel mounted for rotation about an axis within a housing defining an axially facing, annular shaped compressor outlet, said compressor wheel having compressor blades for providing an annular flow of compressed oxidant through said compressor outlet when said compressor wheel is rotated in a direction of rotation about said axis, said annular flow having both an axially directed component of motion and a tangentially directed swirl component of motion in said direction of rotation of the compressor wheel;

a turbine including a turbine wheel having turbine blades, and a nozzle adjacent said turbine blades, said nozzle being adapted to receive hot gases of combustion and to direct said hot gases of combustion at said turbine blades to cause rotation of said turbine wheel about said axis; and drive means for operatively coupling said compressor wheel to said turbine wheel in such a manner that said drive means will cause said compressor wheel to rotate about said axis when said turbine is supplied with said hot gases of combustion;

a reverse-flow annular combustor for combusting fuel and oxidant to provide said hot gases of combustion, said combustor comprising;

an annular inlet disposed about said axis for receiving said annular flow of oxidant from said compressor, and an annular outlet disposed about said axis for delivering a flow of said hot gases of combustion to said nozzle, with said inlet and outlet being disposed in a substantially coplanar relationship within a common transversely oriented input/output plane at one axial end of said combustor, said inlet being disposed radially outward of said outlet;

a liner having generally annular shaped, radially spaced, inner and outer walls extending axially from said outlet and connected at an opposite, upstream axial end of said combustor by a radially extending wall, such that said liner defines an annular combustion chamber disposed about said axis and terminating at a downstream end thereof in said annular outlet leading to said nozzle;

a housing extending from said inlet and surrounding said liner in a spaced relationship to define a plenum chamber between said housing and said liner for directing said annular flow of compressed oxidant about said liner;

fuel and oxidant injector means extending through one or more of said walls of said liner for injecting one or more streams of fuel and one or more streams of compressed oxidant from said plenum chamber into said combustion chamber and mixing said streams to form a combustible mixture of said fuel and oxidant, with said fuel injector means being configured to inject fuel into said combustion chamber along a first transverse plane adjacent said end wall and in a generally tangential direction substantially matching the direction of rotation of the compressor wheel;

ignitor means for igniting and combusting said mixture in a manner producing a generally circumferentially spiraling flow of said fuel, oxidant, and hot gases of combustion emanating at said fuel injector means and extending generally in a downstream direction toward said outlet of the combustor, with said circumferentially spiraling flow having components of flow in both a downstream axial direction and a tangential direction substantially matching the direction of rotation;

deflector jet means extending through one of said walls of said liner for injecting a portion of said annular flow of oxidant, in the form of a deflector jet having at least a component of motion in a generally circumferentially spiraling flow of fuel, oxidant, and hot gases of combustion in such a manner that the downstream axial component of motion of the circumferentially spiraling stream is deflected toward said end wall and said axial component of motion of said circumferentially spiraling flow is diminished thereby increasing dwell time of the hot gases of combustion within the combustion chamber to provide improved combustion efficiency and reduced emissions;

cooling means for injecting a cooling film of oxidant along one or more of said walls of said liner, and secondary oxidant inlets extending through one or more of the walls of said liner and disposed along a third transverse plane axially displaced in the downstream direction from said second transverse plane to create dynamic oxidant baffles which function to segregate that portion of the combustion chamber extending substantially from the end wall to the third transverse plane into a primary combustion zone, including therein said fuel and oxidant injector means, the deflector jets, and a portion of said cooling means;

tertiary oxidant inlets extending through one or more of the walls of said liner and disposed along a fourth transverse plane axially displaced in the downstream direction from said third transverse plane to create dynamic oxidant baffles which function to further subdivide the combustion chamber downstream from the primary combustion zone into a secondary combustion zone extending substantially between the third and fourth transverse planes, and a dilution zone extending substantially between the fourth transverse plane and the outlet of the combustion chamber; and wherein the total amounts of oxidant respectively entering the primary, secondary, and dilution zones of the combustion chamber are controlled to about twenty-five percent, thirty percent, and the remainder of one hundred percent of the oxidant entering the combustion chamber from the plenum chamber.

51. The gas turbine engine of claim 50 wherein said secondary oxidant inlets are provided in the form of a row of oxidant blast tubes radially spaced in a circumferential array along the third transverse plane and extending through the outer wall of the liner to provide a passage for pressurized oxidant to enter the combustion zone from the plenum chamber, with said oxidant blast tubes having radially inner ends disposed within the combustion chamber and skewed in the direction of rotation of the compressor.

52. The gas turbine engine of claim 50 wherein said tertiary inlets are provided by holes extending through the inner and outer walls of the liner along the fourth transverse plane.

53. A combustor for receiving fuel and air and burning a mixture of said fuel and air to produce hot gases as a source of power or propulsion, said combustor comprising:

a means for creating a first, generally spiral flow path for the hot gases along a first axis from a region where combustion occurs to a region where the hot gases exit the combustor;

a means for creating a second, generally spiral flow path for the hot gases and mixtures of fuel and air along a second axis within the region where combustion occurs;

a means for creating a third, generally spiral flow path for the hot gases and mixtures of fuel and air along a third axis within the region where combustion occurs; and said first axis being generally orthogonal with respect to said second and third axes.

54. The combustor according to claim 53 wherein the fuel is initially injected into the region where combustion occurs at a location adjacent the second axis.

55. The combustor according to claim 53 further including a centrifugal flow of uncombusted gas, and wherein ignition and oxidation means are provided and disposed within the region where combustion occurs such that the path of combusted gas flow substantially contains the centrifugal flow of uncombusted gas.

56. The combustor according to claim 54 wherein the hot gases exit the region where combustion occurs at locations radially inward, with respect to a longitudinal centerline of the combustor, from the location where fuel is introduced to that region.

57. The combustor according to claim 53 wherein the combustor has a generally annular configuration defined between inner and outer walls, and an end wall joins the inner and outer walls at one end of the combustor, and an outlet is disposed at the other end of the combustor for hot gas to exit the combustor.

* * * * *